US006387569B1

United States Patent
Licht

(10) Patent No.: US 6,387,569 B1
(45) Date of Patent: *May 14, 2002

(54) CONDUCTIVE IRON-BASED STORAGE BATTERY

(75) Inventor: Stuart Licht, Haifa (IL)

(73) Assignee: Chemergy Ltd., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/519,996

(22) Filed: Mar. 6, 2000

Related U.S. Application Data

(63) Continuation-in-part of application No. 09/072,448, filed on May 5, 1998, now Pat. No. 6,033,343.

(30) Foreign Application Priority Data

May 5, 1997 (IL) .................................................. 127084

(51) Int. Cl.⁷ ................................................. H01M 4/02
(52) U.S. Cl. ....................................... 429/221; 429/209
(58) Field of Search ........................................ 429/221

(56) References Cited

U.S. PATENT DOCUMENTS

| | | | | |
|---|---|---|---|---|
| 4,451,338 A | * | 5/1984 | Deininger | .................... 429/221 |
| 4,567,031 A | * | 1/1986 | Riley | .......................... 429/221 |
| 4,675,256 A | | 6/1987 | Winchester et al. | |
| 4,795,685 A | | 1/1989 | Bones et al. | |
| 5,429,894 A | | 7/1995 | Leap et al. | |
| 6,033,343 A | * | 3/2000 | Licht | .......................... 429/221 |

FOREIGN PATENT DOCUMENTS

WO  WO98/50970  * 11/1998  ............ H01M/4/52

OTHER PUBLICATIONS

Goff, H. et al., "Studies on the Mechanism of Isotopic Oxygen Exchange and Reduction of Ferrate (VI) Ion ($FeO_4^{2-}$)¹," J. Amer. Chem. Soc., 93:23, Nov. 17, 1971, pp. 6058–6065.

Gump, J. et al., "Preparation and Analysis of Barium Ferrate (VI)," Anal. Chem., 26, 1954, p. 1957.

Thompson, G. et al., "Preparation and Purification of Potassium Ferrate. VI," J. Amer. Chem. Soc. 73, Mar. 1951, pp. 1379–1381.

Schreyer, J. et al., "Stability of the Ferrate (VI) Ion in Aqueous Solution," Anal. Chem. 23, 1951, pp. 1312–1314.

* cited by examiner

Primary Examiner—Gabrielle Brouillette
Assistant Examiner—Mark Ruthkosky
(74) Attorney, Agent, or Firm—Browdy and Neimark

(57) ABSTRACT

An electric storage battery having a solid phase Fe(VI) salt cathode. The anode may be any of a large variety of conventional anode materials capable of being oxidized. The cathode and anode are located in separate half-cells which are in electrochemical contact through an electrically neutral ionic conductor. Small material additions to the Fe(VI) salt containing half cell can be used to control the conductance and electrochemical characteristics of the battery.

18 Claims, 4 Drawing Sheets

CONDUCTIVE IRON-BASED STORAGE BATTERY

This is a continuation-in-part of parent application Ser. No. 09/072,448, filed May 5, 1998, now U.S. Pat. No. 6,033,343.

The present invention relates to electric storage batteries. More particularly, the invention relates to a novel electric storage battery with an iron salt as cathode.

BACKGROUND OF THE INVENTION

There is an ongoing need for providing novel improved electrical storage batteries, which are low-cost, have a high-energy density and are environmentally acceptable. Among the main types of storage batteries are those in which the cathodes (the positive electrodes) are based on any of $PbO_2$, $HgO$, $MnO_2$ and $NiOOH$ which are known to possess a theoretical capacity in the range of between 224 to 308 Ah/g. However, these cathode materials are considered as hazardous or environmentally unfriendly.

In a very recent U.S. Pat. No. 5,429,894, iron-silver (iron in its zero valence state) was suggested as a battery anode (negative). Iron salts in the +2 and +3 valence state, were also suggested as a battery cathode in the past as described, for example, in U.S. Pat. No. 4,675,256 and U.S. Pat. No. 4,795,685.

Prima facie, salts containing iron in the +6 valence state, hereafter called Fe(VI), which are capable of multiple electron reduction, would be capable to provide a higher cathode storage capacity. However, decomposition with reduction of the iron to a less oxidized form (i.e. to a lower valence state) occurs very rapidly, the stability of Fe(VI) salt solutions being only the order of a few hours at room temperature (Anal. Chem. 23, 1312–4, 1951). The Fe(VI) salts may be made by chemical oxidation, such as reported by G. Thompson (J. Amer. Chem. Soc. 73, 1379, 1951), or by precipitation from another Fe(VI) salt, such as reported by J. Gump et al. (Anal. Chem. 26, 1957, 1954). However, as mentioned in a later report by H. Goffet al (J. Amer. Chem. Soc. 93, 6058–6065, 1971), only little is known on the chemistry of Fe(VI) salts. The decomposition of an Fe(VI) salt to a salt in which the iron has a lower valence, results in a spontaneous loss of the electrochemical storage capacity. For example, the anion $FeO_4^{-2}$ such as in $K_2FeO_4$, is unstable in neutral aqueous solutions and decomposes at a rate $k_f$ according to the following equation:

$$2FeO_4^{2-}+3H_2O \rightarrow 2FeOOH+3/2O_2+4OH^-$$

The resultant product in this decomposition, Fe(III)OOH, is environmentally more friendly than any of $PbO_2$, $HgO$, $MnO_2$ and $NiOOH$, but has a lower electrochemical storage capacity.

It is an object of the present invention to provide a novel type of battery which is inexpensive, highly stable, possesses a high storage capacity, a high voltage and is environmentally friendly, a battery using additives which can further improve the electrochemical characteristics of the battery.

BRIEF DESCRIPTION OF THE INVENTION

The invention relates to an electrical storage cell, so-called battery, comprising two half-cells which are in electrochemical contact with one another through an electrically neutral ionic conductor, wherein one of said half-cells comprises an anode and the other half-cell comprises a cathode in form of a solid-phase Fe(VI) salt in an amount of at least 1% of the half-cell weight, whereby electrical storage is accomplished via electrochemical reduction to a valence of iron salt less than Fe(VI). The high +6 valence state of the iron in said salt provides the advantage of a high storage capacity and high voltage, and iron salts provide an environmental advantage over more toxic materials used for electrochemical electric storage. Small material additions to the Fe(VI) salt containing half cell, and to the electrically neutral ionic conductor can further improve the electrochemical characteristics of the battery.

DETAILED DESCRIPTION OF THE INVENTION

Figure 1:
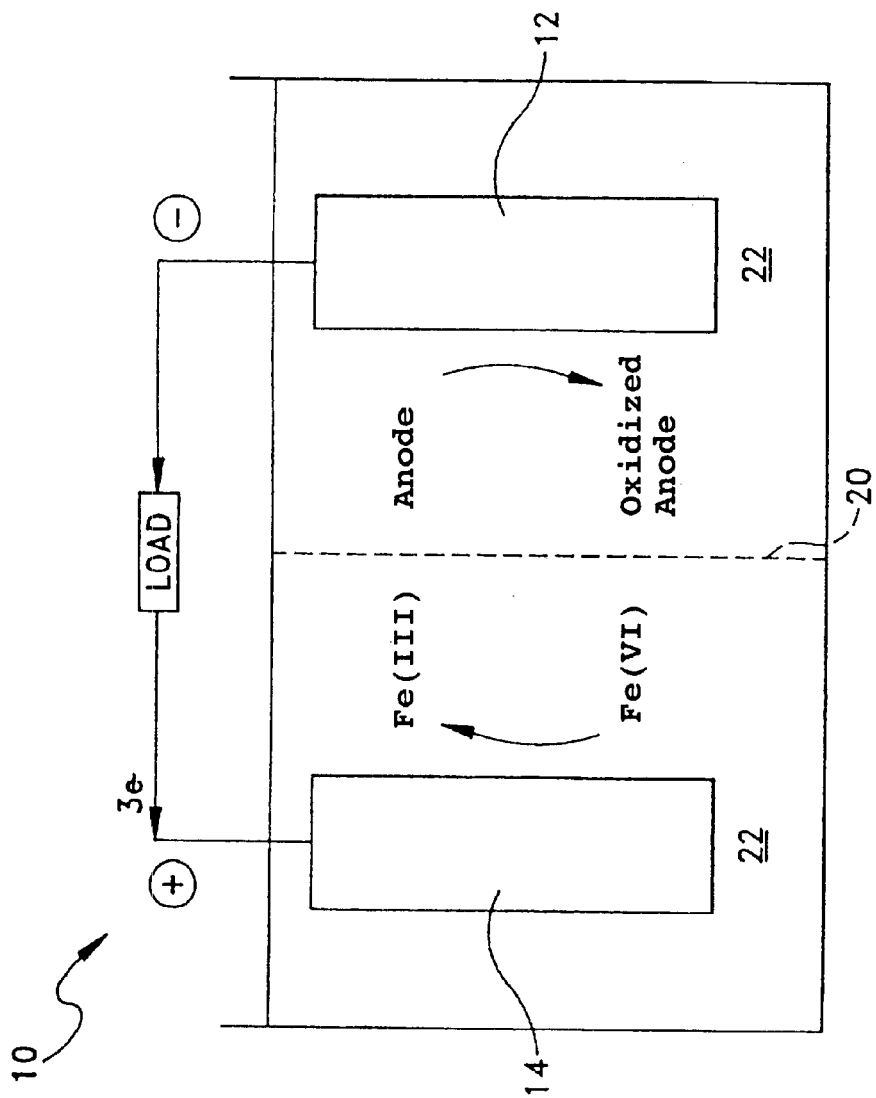
FIG. 1 is a diagrammatic illustration of an Fe(VI) battery according to the invention.

The novel battery according to the present invention is based on an Fe(VI) (hereafter occasionally referred to as "super iron") half cell serving as cathode, in contact with an anode half cell through an electrically neutral ionic conductor. The discharge in this battery is based on the reduction of the Fe(VI) salt to the +3 valence state. The Fe(VI) salt, e.g. $M_2FeO_4$ where M is an alkali cation or ammonium, may be prepared by oxidation of iron. Several chemical oxidation methods have been suggested, but among methods which yield Fe(VI) salts of highest purity is the one reported by G. Thompson (J. Amer. Chem. Soc. 73, 1379, 1951). By this method, Fe(VI) salts are obtained through the reaction of a solution of hydroxide and hypochlorite (such as NaOH and NaOCl) with an Fe(III) salt, such as $Fe(NO_3)_3$, as illustrated below:

$$2Fe(OH)_3+3ClO^-+4OH^- \rightarrow 2FeO_4^{-2}+3Cl^-+5H_2O \qquad (1)$$

and the resulting Fe(VI) salt (such as $K_2FeO_4$) is recovered by precipitation from a less soluble solution (such as concentrated KOH), and is then cleaned and dried. The Fe(VI) synthesis method can effect battery performance, and one preferred embodiment is exemplified, but not limited, by the use of a KOH rather than NaOH hydroxide solution.

Further typical examples of Fe(VI) salts are $M_x(FeO_4)_y$ where M is a cation from the group of alkali earth metal cations, transition metal cations and cations of elements of groups III, IV and V of the periodic table, or from the lanthanide and actinide series. Similarly Fe(VI) salts in addition to oxygen, can contain hydroxide and/or other anions, Z, of and of the generalized form: $M_xFeZ_y$, and can contain multiple Fe(VI) groups. The anions, Z, include, but are not limited to: hydroxides, acetates, acetylsalicylates, aluminates, aluminum hydrides, amides, antomonides, arsenates, azides, benzoates, borates, bromides, bromates, carbides, carbonates, chlorates, perchlorates, chlorides, hypochlorites, chlorites, dithiones, chloroplatinates, chromates, citrates, fluorides, fluosilicates, fluosulfonates, formates, gallium hydrides, gallium nitrides, germanates, hydrides, iodates, iodides, periodate, laurates, manganates, malonates, permanganates, molybdates, myristates, nitrates, nitrides, nitrites, oxalates, oxides, palmitates, phosphates, salicylates, selenates, selenides, silicates, silicides, stearates, succinates, sulfates, sulfides, sulfites, tartrates, thiocyanates, thionates, titanates, tungstates, halides, or chalcogenides. Additionally, each Fe(VI) salts can contain n water or other solvent molecules, W of the generalized form, not limited to: M $FeZ_{8/y} \cdot W_n$. Examples thereof include, but are not limited to $K_2FeO_4$, $Na_2FeO_4$, $Li_2FeO_4$, $Cs_2FeO_4$, $Rb_2FeO_4$, $H_2FeO_4$, $(NH_4)_2FeO_4$, $(N(C_4H_9)_4)_2FeO_4$, $BeFeO_4$, $MgFeO_4$, $CaFeO_4$, $SrFeO_4$, $BaFeO_4$, $BaFeO_4 \cdot H_2O$, $BaFeO_4 \cdot 2H_2O$, $La_2(FeO_4)_3$, $CeFeO_4 \cdot 2H_2O$, $Ce_2(FeO_4)_3$, $Hg_2FeO_4$, $HgFeO_4$, $Cu_2FeO_4$, $CuFeO_4$, $ZnFeO_4$, $Ag_2FeO_4$, $FeO_3$, $FeFeO_4$, $Fe_2(FeO_4)_3$, $CrFeO_4$, $MnFeO_4$, $NiFeO_4$, $CoFeO_4$, $Al_2(FeO_4)_3$, $In_2(FeO_4)_3$, $Ga_2(FeO_4)_3$, $SnFeO_4$, $PbFeO_4$, $Sn(FeO_4)_2$, $Pb(FeO_4)_2$.

Several Fe(VI) syntheses methods which include precipitation from another Fe(VI) salt have been suggested, but the method which yields among the highest purity Fe(VI) salts is the method reported by J. Gump et al. (Anal. E Chem. 26, 1957, 1954). By this method, Fe(VI) salts may be obtained through the reaction of an existing Fe(VI) salt (such as $K_2FeO4$) with a soluble salt (such $BaCl_2$ or $BaNO_3$) to precipitate another Fe(VI) salt (such as $BaFeO_4$).

Without being bound to any theory, based on the three-electron reduction of these materials as expressed in the equation:

$$FeO_4^{2-} + 3H_2O + 3e^- \rightarrow FeOOH + 5OH^- \tag{2}$$

the electrical storage capacity is high as represented for a few of the materials in Table 1.

TABLE 1

Cathode storage capacity of several Fe(VI) salts of Formula Wt., FW.

| Fe(VI) salt | FW, g/mole | Reduction | Charge capacity |
|---|---|---|---|
| $Li_2FeO_4$ | 133.8 | 3e-/Fe(VI) | 601 A hour/kg |
| $Na_2FeO$ | 165.9 | 3e-/Fe(VI) | 485 A hour/kg |
| $K_2FeO_4$ | 198.0 | 3e-/Fe(VI) | 406 A hour/kg |
| $Cs_2FeO_4$ | 385.6 | 3e-/Fe(VI) | 206 A hour/kg |
| $AgFeO_4$ | 227.7 | 3e-/Fe(VI) | 353 A hour/kg |
| $AgFeO_4$ | 227.7 | 5e-/Fe(VI)+Ag(II) | 588 A hour/kg |
| $Ag_2FeO_4$ | 335.6 | 5e-/Fe(VI) | 236 A hour/kg |
| $Ag_2FeO_4$ | 335.6 | 4e-/Fe(VI)+Ag(I) | 319 A hour/kg |
| $MgFeO_4$ | 144.1 | 3e-/Fe(VI) | 558 A hour/kg |
| $CaFeO_4$ | 159.9 | 3e-/Fe(VI) | 505 A hour/kg |
| $SrFeO_4$ | 207.5 | 3e-/Fe(VI) | 387 A hour/kg |
| $BaFeO_4$ | 257.2 | 3e-/Fe(VI) | 313 A hour/kg |

The Fe(VI) salt whose preparation is exemplified by, but not limited to either chemical oxidation of Fe(III) or precipitation from another Fe(VI) salt is placed in contact with a conductive material, such as graphite, carbon black or a metal. These and other agents can be formed by mixing with Fe(VI) as a powder, and the powder can be pressed with these and other agents to improve mechanical strength. Variations to the conductive material or other agents can improve the electrochemical characteristics of the battery. Variations include, but are not limited to, a fluorinated polymer graphite, a controlled particle size graphite, a low ash content graphite, compressed carbon black or none carbon materials, such as ZrN, TiN, and $In_2O_3$. A fluorinated polymer graphite can be used to control the battery discharge voltage and improve the discharge efficiency. A graphite with ash content 10% or less, and in the preferred ash content of 1% or less, can be used to enhance the battery voltage and discharge efficiency. A carbon black which is more highly compressed, rather than less highly compressed, can be used to enhance the battery voltage and discharge efficiency. A graphite with particle size 50 μm or less, and in the preferred particle size 1 μm or less, can be used to enhance the battery voltage and discharge efficiency. A carbon black which is more highly compressed, rather than less highly compressed, can be used to enhance the battery voltage and discharge efficiency. ZrN, TiN, and $In_2O_3$ in the cathode can be used to form a low discharge voltage, high discharge efficiency cell.

Rather than mixing with a conductive material, the Fe(VI) salt can be placed in direct contact with a conductive material. These conductive materials include but are not limited to a planar conductive surface, a wire, a porous conductive substrate or a conductive grid.

The anode of the battery may be selected from the known list of metals capable of being oxidized, typical examples being zinc, lithium; common battery anodes such as cadmium, lead and iron; high capacity metals such: aluminum, magnesium, calcium; and other metals such as copper, cobalt, nickel, chromium, gallium, titanium, indium, manganese, silver, cadmium, barium, tungsten, molybdenum, sodium, potassium, rubidium and cesium.

The anode may also be of other typical constituents capable of being oxidized, examples include, but are not limited to hydrogen, (including but not limited to metal hydrides), inorganic salts, and organic compounds including aromatic and non-aromatic compounds. The anode may also be of other typical constituents used for lithium-ion anodic storage, examples include, but are not limited to lithium-ion in carbon based materials and metal oxides.

The electrically neutral ionic conductor utilized in the battery according to the present invention, comprises a medium that can support current density during battery discharge. A typical representative ionic conductor is an aqueous solution preferably containing a high concentration of a hydroxide such as KOH. In other typical embodiments, the electrically neutral ionic conductor comprises common ionic conductor materials used in batteries which include, but are not limited to an aqueous solution, a non-aqueous solution, a conductive polymer, a solid ionic conductor and a molten salt.

In a preferred embodiment of the invention, the cell includes gas separator means such as vent or a void space for preventing the build-up in the cell of oxygen, hydrogen and other gases.

According to another embodiment of the invention, means are provided to impede transfer of chemically reactive species, or prevent electric contract between the anode and Fe(VI) salt cathode. Said means includes, but is not limited to a membrane, a ceramic frit, a non-conductive separator configured with open channels, grids or pores or agar solution; such means being so positioned as to separate said half cells from each other.

An electric storage battery according to the invention may be rechargeable by application of a voltage in excess of the voltage as measured without resistive load, of the discharged or partially discharged cell.

Small material additions to the Fe(VI) salt containing half cell can improve the electrochemical characteristics of the battery. A material addition of a various compound, from 0.1 to 25%, and in the preferred range from 1 to 10%, can be used to alter and control the electrochemical discharge characteristics. In a preferred embodiment these include titanium compounds such as Ti(IV) or Ti(II) salts. In another preferred embodiment these include tin compounds such as Sn(IV) or Sn(II) salts. In other embodiments these include lanthanum, cerium, neodymium, or europium compounds, such La(III), Ce(III), Ce(IV), Nd(III), Eu(II) or Eu(III) salts.

In another typical embodiment the Fe(VI) cathode may be only partially discharged with the possibility that the discharge is continued at a later time. Restarting the discharge is equivalent to a new cathode in which the valence state is less than Fe(VI), that is Fe(VI-x); where 3<x<6. An example of this typical embodiment is one third discharge of the Fe(VI) cathode, at this point x=1 and restarting the discharge is equivalent to a new cathode in which the valence state is Fe(V). Another example of this typical embodiment is when the Fe(VI) cathode is two thirds discharged, at this point x=2, and restarting the discharge is equivalent to a new cathode in which the valence state is Fe(IV). These examples of the embodiment may be equivalently formed by initially starting with known Fe(V) or Fe(IV) salts. For example the Fe(IV) salt, $BaFeO_3$, has been formed from the Fe(VI) salt, $BaFeO_4$, by heating the latter for 7–20 minutes at 90–100° C. in 50% KOH or NaOH is done by R. Scholder, et al. (Ztschr. anorg. allgem. Chem., 238, 338, 1956) and done by M. Wronska (Roczn. chem., 36, 789, 1962), and the Fe(V) salt, $K_3FeO_4$, has been formed from the Fe(VI) salt, $K_2FeO_4$, by heating the latter with anhydrous KOH (Fe:K= 1:3) in an $O_2$ stream at 600–700° C. as done by R. Scholder (Bull. soc. chim. France, 4, 1113, 1965). Albeit at a lower capacity than the Fe(VI) half cell battery, these Fe(V) and Fe(IV) salts can be used as super iron half cells to also provide a high capacity super iron battery.

DETAILED DESCRIPTION OF FIG. 1

FIG. 1 illustrates schematically an electrochemical cell 10 based on an Fe(VI) half cell, an electrically neutral ionic conductor and an anode. The cell contains an electrically neutral ionic conductor 22, such as a concentrated aqueous solution of KOH, in contact with an Fe(VI) cathode 14 in form of a pressed pellet containing graphite powder and solid $K_2FeO_4$. Reduction of Fe(VI) ions such as in the form of $FeO_4^{2-}$ anions, is achieved via electrons available from the electrode 14. The anode electrode 12, such as in the form of metal is also in contact with the electrically neutral ionic conductor 22. Electrons are released in the oxidation of the anode. Optionally, the cell may contain an ion selective membrane 20 as a separator, for minimizing the non-electrochemical interaction between the cathode and the anode.

The invention will be hereafter illustrated by the following Examples, it being understood that the Examples are presented only for a better understanding of the invention without implying any limitation thereof, the invention being covered by the appended claims.

The methods of the present invention are described in further detail with reference to the following, non-limiting Examples are in addition to those in Ser. No. 09/072,448. As is apparent from the comparative examples, significant increases in service performance of an alkaline electrochemical cell may be obtained using various cathode conductors, cathode additives, and sodium free Fe(VI) materials. Although the examples used button or AAA cells, it will be appreciated by those skilled in the art that the increase in performance may be obtained regardless of the cell size. Because some of the above conductors or additives perform better than others, it may be desirable to combine such conductors or additives to enhance the overall cell performance. It will be understood by those who practice the invention and by those skilled in the art, that various modifications and improvements may be made to the invention without departing from the spirit of the disclosed concept.

EXAMPLE 1

An experiment was carried out, the object being to modify, with addition of various conductors, the discharge voltage or discharge capacity of the Fe(VI) containing battery, hereafter referred to as the Super-iron battery. Super-iron (zinc anode) batteries with $BaFeO_4$ or $K_2FeO_4$ cathodes, were discharged at a 500Ω load using a cell configuration: 1.1 cm diameter button cells using the original (commercial) anode and separator. 12 mg of 12 M KOH electrolyte is added to a cathode prepared from 31 mA (99 mg) $BaFeO_4$ containing an addition 10% carbon by mass. In addition the battery is tested with the Fe(VI) cathode containing several conductive materials comprising 10 percent by weight. Discharge of the batteries is summarized in FIG. 2 in which the cell discharge potential is measured as a function of the measured discharge capacity.

Carbon based conductive investigated include those from Alfa Aesar Company such as fluorinated, polymer graphite powder consisting of $(CF_x)_n$, activated carbon powder with 4% ash, acetylene carbon black, either fully or 50% compressed, colloidal graphite, natural graphite powder 200 mesh (74 μm size and less), synthetic graphite powder 325 mesh (44 μm size and less), microcrystalline graphite powder 300 mesh (50 μm size and less) with a high (18–25%) ash content, graphite adhesive with 1 μm average flake size. In addition 1 μm particle size graphite from Leico Industries was examined. Non-carbon based conductors investigated include ZrN, TiN, and $In_2O_3$.

Figure 2:
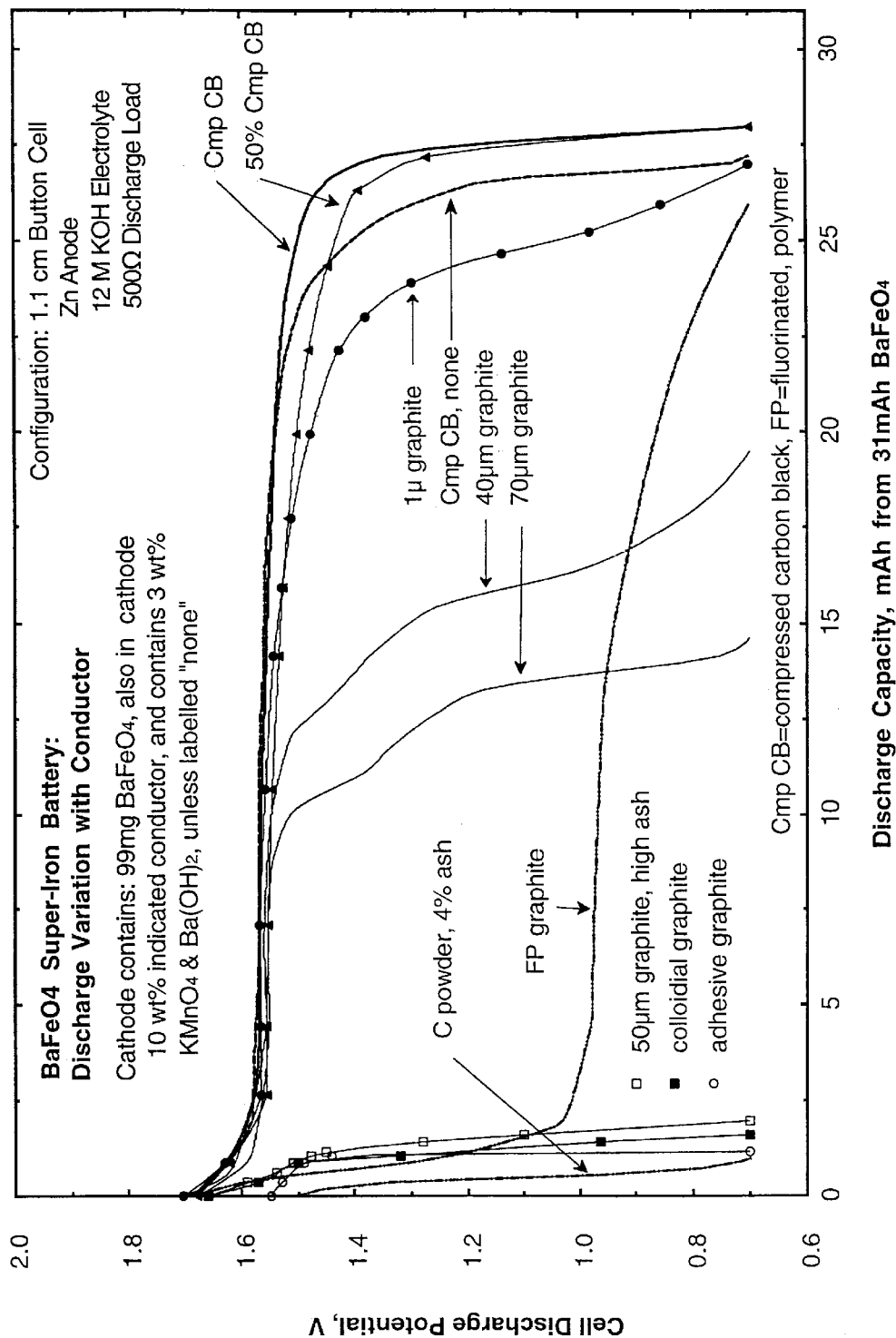
FIGS. 2, 3 and 4: illustrate graphically performance of various battery aspects according to the invention as described in the Examples.

The carbon based cathode materials added to the Fe(VI) cathode are observed to be described by four categories in FIG. 2. Three of these categories consist of materials supporting inefficient, intermediate, or efficient Fe(VI) charge transfer. The inefficient (very low discharge capacity) category includes carbon powder with 4% ash, high ash microcrystalline, colloidal and adhesive graphites. Unlike the other graphites examined, the colloidal and adhesive graphites are added as liquid suspensions, and both exhibit poor Super-Iron battery discharge characteristics. Similarly, poor Super-Iron battery discharge characteristics are exhibited by the high ash carbon or graphite. The intermediate category includes the 40 μM and 70 μm particle size graphites. Finally, the efficient Fe(VI) charge transfer category comprises carbon black (either 50% or fully compressed) and 1 μm graphite as added conductors. As seen in the figure, the fully compressed carbon black provides improved Super-Iron battery discharge characteristics compared to the 50% compressed carbon black cathode conductor. As also noted in the figure, further small (3%) addition to the cathode of $KMnO_4$ and $Ba(OH)_2$ can further improve the discharge characteristics. The data in FIG. 1 is for $BaFeO_4$ cathodic discharge. Similar relative variations with the same conductors are observed for $K_2FeO_4$ cathodic discharge; although at comparable high discharge rates, the three electron discharge efficiency of $K_2FeO_4$ is lower than that of $BaFeO_4$.

A fourth category of conductor effect on Fe(VI) charge transfer is observed, and is described as conductors which suppress the discharge voltage, but permit a high discharge capacity. As observed in FIG. 2, this category includes a fluorinated, polymer graphite additive. Inorganic examples of this fourth category appear to include ZrN, TiN, and $In_2O_3$. However, the intrinsic conductivity of these materials is only observed to support significant Fe(VI) reduction under conditions of low discharge current density and high percent composition of the conductor (for example 10,000Ω discharge of the button cell described in FIG. 2, but containing 50% by weight ZrN, TiN, and $In_2O_3$ in the cathode). As shown in FIG. 2, a smaller quantity of the fluorinated graphite additive sustains efficient Fe(VI) discharge.

EXAMPLE 2

The effect of the fluorinated graphite polymer are further explored in with a conventional AAA cylindrical cell configuration. These measurements use components from a commercial Zn/MnO$_2$ alkaline cells in which the existing MnO$_2$ cathode has been removed, and replaced in each cell with a 1.3 Ah cathode of 4.16 g 96% purity BaFeO$_4$. In addition, the cathode contains 10% by weight of various conductors, and the anode has added 250 mg of saturated KOH in 50 mg of poly(acrylic acid-co-acrylamide) polymer. Due to the low discharge potential observed in several of these cells, all cells are discharged at the same relatively resistance of 75Ω (a current density of approximately 0.02 A). As seen in the top curve of FIG. 3, and consistent with the results of Example 1, a mix of 1 μm graphite and carbon black sustains a high discharge potential throughout an efficient three electron reduction of the Fe(VI). Not shown in the figure, we also observe that diminishing by half, to 3%:2% graphite:carbon black mix, has no discernible effect on the discharge voltage at 75Ω load. These type of 1μ graphite:carbon black BaFeO$_4$ mix cathode mixes are observed capable of supporting efficient sustained Fe(VI) reduction at high 1 A current densities in this AAA cell configuration.

Figure 3:
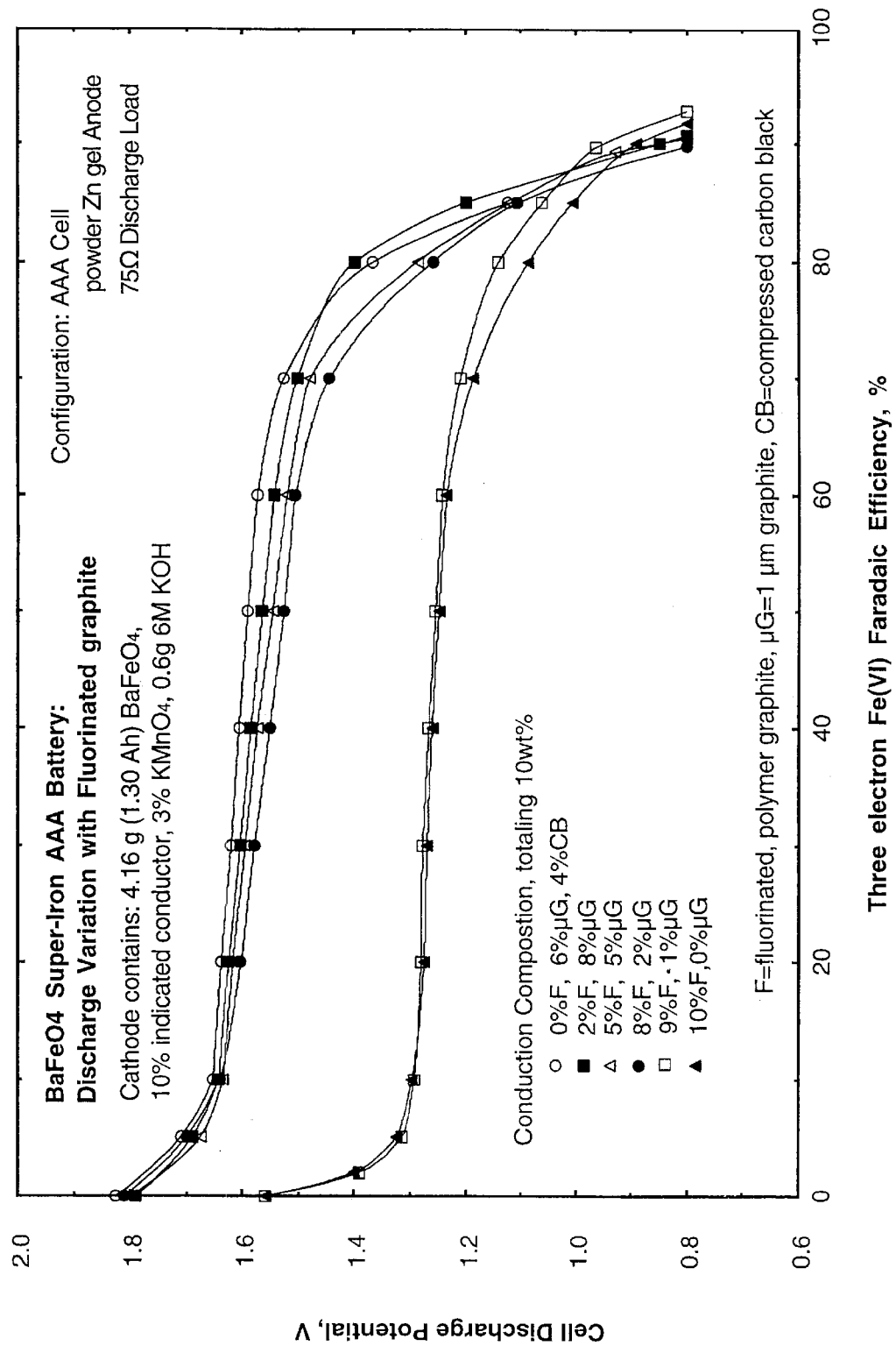

The lowest curve in FIG. 3 is obtained with an alternate cathode mix containing only fluorinated, polymer graphite. A lower, but significant, discharge voltage of 1.2 to 1.3 V is sustained. Despite these significant polarization losses, this conductor supports a somewhat higher Fe(VI) faradaic efficiency than observed with the graphite/carbon black conductor. As seen in the figure replacement of 1% of the fluorinated polymer graphite with the 1 μm graphite has little effect on the discharge potential, but marginally improves the faradaic efficiency to approximately 92%. This significant faradaic efficiency is higher yet, when normalized for the 96% purity of the BaFeO$_4$ utilized in the cathode. Replacement of higher amounts of the fluorinated, polymer graphite with the 1 μm graphite provides control of the discharge voltage. The discharge voltage jumps by 300 mV when 2% of 1 μm graphite is utilized, and as seen in the figure the discharge potential continues to increase when 5% of 1 μm graphite is utilized. Finally, as seen comparing the top two curves of the figure, the 2% fluorinated, polymer graphite:8% 1 μm graphite mix provides a marginally higher faradaic efficiency, albeit it at marginally lower discharge potential, compared to the 1 μm graphite:carbon black cathode mix.

We further demonstrate that these fluorinated, polymer graphite materials are highly stable in the alkaline oxidative environment of a alkaline Super-Iron battery. AAA cells were constructed as above using 10% fluorinated polymer graphite in the BaFeO$_4$ cathode mix. One cell was discharged immediately and the second cell was discharged after a two week shelf time at room temperature. The discharge curves of the two cells was highly similar, and during discharge the second cell exhibited a loss of less than 1% of the capacity over this two week period.

EXAMPLE 3

Figure 4:
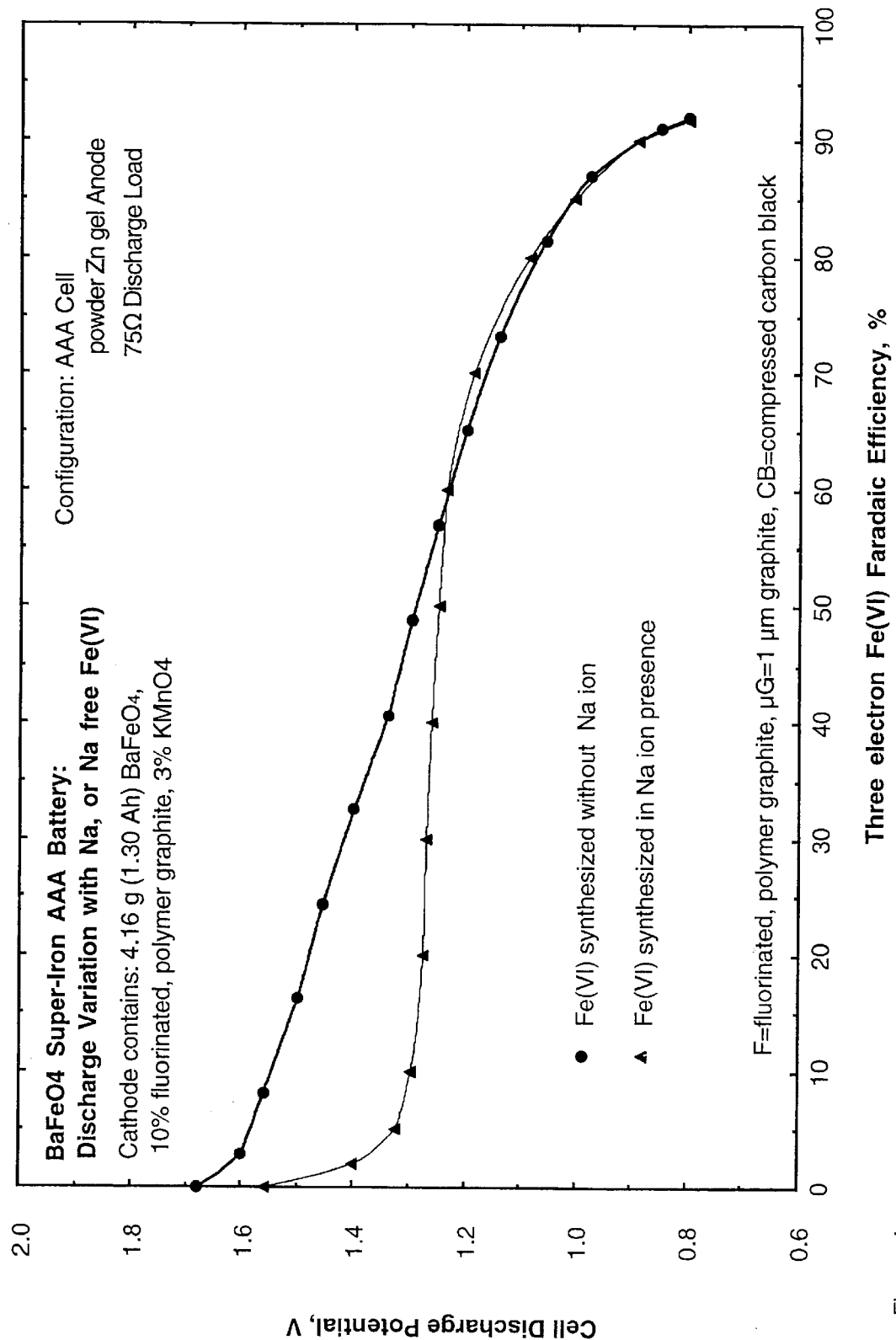

This example demonstrates that Fe(VI) materials without the presence of sodium ions can yield as a cathode material improved battery discharge performance compared to Super-iron batteries using Fe(VI) materials synthesized in the presence of sodium ions. AAA Fe(VI) batteries were constructed utilizing in both cases in the cathode mix, BaFeO$_4$ containing 10% by weight of fluorinated, polymer graphite and 3% by weight of KMnO$_4$. One cell used the sodium free BaFeO$_4$, whereas the second cell used the BaFeO$_4$ synthesized in presence of sodium ions. As seen in FIG. 4 the sodium free Fe(VI) cell improves the discharge potential, and thereby increases the energy, throughout the cell discharge.

BaFeO$_4$ was synthesized either with or without sodium ions as described below. Elemental analysis by inductively coupled plasma, showed the BaFeO$_4$ had an additional 0.1% sodium by weight when synthesized in the presence of sodium ion. The only difference in the preparation of the two materials was that the sodium free Fe(VI) was prepared utilizing KOH whereas the sodium ion containing Fe(VI) material was prepared using NaOH. In each case, the BaFeO$_4$ was prepared as follows:

1000 ml of concentrated NaOH or KOH solution (with either 750 g of NaOH or 620 g KOH) is chlorinated with Cl$_2$ generated from 250 g KMnO$_4$ and 1130 ml of 37% HCl) with vigorous stirring. Chlorination is continued until the solution weight increased 250 gram, requiring approximately 90 minutes. 885 g of NaOH or 1460 g KOH are added slowly, with stirring, to the solution initially cooled at 10° C., and maintained below 30° C. during addition. The solution is cooled to 20° C. and stirred for 15 more minutes. The precipitated NaCl is removed by filtration through a funnel with a 230 mm diameter glass microfibre filter. To the alkaline NaClO solution at 10° C., 315 g of powdered Fe(NO$_3$)$_3$.9H$_2$O is added. An ice-salt bath is used to maintain a temperature below 35° C. The temperature is maintained at 20° C. for 60 minutes with mechanical stirring. 1000 ml of 12M KOH and 250 ml distilled water at 0° C. is added with stirring. After 5 minutes the suspension is filtered on two No. 1 sintered glass filters.

The two precipitates are dissolved in 1600 ml of 2.75 M KOH, and filtered directly into 1700 ml of 12 M KOH at 0° C., through a funnel with a 230 mm diameter glass microfibre filter paper. The solution is stirred for 15 minutes at 3° C., and then the solution is filtered on a sintered glass filter No 2. The wet K$_2$FeO$_4$ is dissolved in 850 ml of 2.57 M KOH at 0° C., and quickly filtered through 2 sheets of 150 mm diameter glass microfibre filter paper, into a filtering flask containing 2700 ml of 12 M KOH. The suspension in the flask is stirred for 15 minutes at 0° C. and is filtered through a sintered glass filter No 2. On the same filter, the precipitate is rinsed: 4 times with 160 ml n-hexane, 2 times with 80 ml isopropyl alcohol, 8 times with 150 ml methanol, and 3 times with 80 ml diethyl ether. It is dried under vacuum at room temperature.

The conversion to BaFeO$_4$ starts with a solution prepared from 210 g Ba(OH)$_2$.8H$_2$O dissolved in 5000 ml water, without CO$_2$ at 0° C., and then filtered through glass microfibre filter paper (solution A). 80 gram K$_2$FeO$_4$ was dissolved in 1600 ml 2% KOH solution (37.6 gram KOH in 1600 ml CO$_2$ free water) at 0° C., and then filtered through GF/A filter paper (150 mm) to solution A with stirring at 0° C. (using an ice bath), and stirring continued 10 minutes. The mixture obtained was filtered on single funnel with GF/A glass microfibre paper, diameter of 230 mm, and then, the residue of BaFeO$_4$ was washed with cold CO$_2$ free, deionized water until the resultant BaFeO$_4$ reached pH=7, and then dried at room temperature.

EXAMPLE 4

This example demonstrates that additives to the Fe(VI) cathode mix can improve the Super-Iron battery performance by increasing the amp hour capacity generated during cell discharge. A Fe(VI) cathode/Zn anode, alkaline electrolyte button cell was discharged, containing a 31 mAh K$_2$FeO$_4$ cathode and also 6 weight percent 1 μm graphite, 4% carbon black, and 3% KMnO$_4$ with or without 5% by weight of several additives. In several cases these additives provide a small improvement. These cases include cerium oxide, lanthanum oxide, neodymium oxide, europium oxide. However, in two cases, the cases in which the additive is a titanium or tin salt additive, a larger increase was observed as summarized in the table below. At a 1.0 volt cutoff, the experimental cells summarized in Table 2 having the tin or titanium additive had a respective average or 6.5% and 12% increase in current capacity compared to those without the additives. Titanium may also be added in the form of titanates, such as strontium, barium, potassium, calcium and cobalt titanates, or any salt which contains titanium ion, such as potassium titanium oxalate. Tin salts include any salt which contains tin ion, such as common Sn(II) salts SnO, and Sn(IV) salts $SnO_2$.

TABLE 2

Measured discharge capacity over 500Ω load, to a 0.8V cutoff, of a 31 mAh $K_2FeO_4$ cathode, 1.1 cm button cell using the original (commercial) Zn anode and separator with 12 mg of 12 M KOH electrolyte. The $K_2FeO_4$ cathode mix contains by weight 6% 1μm graphite, 4% compressed carbon black, 3% $KMnO_4$, and 5% of the additive salt listed in the table.

| additive | Measured Discharge Capacity |
|---|---|
| none | 23.0 mAh |
| $SnO_2$ | 24.5 mAh |
| $TiO_2$ | 25.8 mAh |

What is claimed is:

1. A battery comprising two half-cells which are in an electrochemical contact with one another through an electrically neutral ionic conductor, wherein one of said half-cells comprises an anode and the other half-cell comprises at least 1% of weight of a Fe(VI) salt, whereby electrical discharge or charge is accomplished via an electrochemical charge insertion to or from a valence state of iron salt less than Fe(VI), and a Fe(VI) discharge capacity enhancing material is added to the Fe(VI) containing half cell.

2. The battery according to claim 1, wherein said enhancing material is a fluorinated graphite polymer.

3. The battery according to claim 1, wherein said enhancing material is a graphite.

4. The battery according to claim 1, wherein said enhancing material is a compressed carbon black.

5. The battery according to claim 1, wherein said enhancing material is a indium containing compound selected from the group consisting of the In(III), In(II), or In(IV) compounds.

6. The battery according to claim 1, wherein said enhancing material is a nitride compound.

7. The battery according to claim 3, wherein said graphite is of particle size 5 μm or less.

8. The battery according to claim 3, wherein said graphite is of particle size 1 μm or less.

9. The battery according to claim 3, wherein said graphite has ash content less than 10%.

10. The battery according to claim 3, wherein said graphite has ash content less than 1%.

11. The battery according to claim 3, wherein said graphite has ash content less than 1%.

12. The battery according to claim 1, wherein said Fe(VI) salt is prepared in the absence of sodium ions or sodium containing salts.

13. The battery according to claim 1, wherein said enhancing material is a titanium containing compound, selected from the group consisting of the Ti(IV) and Ti(II) compounds.

14. The battery according to claim 1, wherein said enhancing material is a tin compound, selected from the group consisting of the Sn(II), or Sn(IV) compounds.

15. The battery according to claim 1, wherein said enhancing material, is a lanthanum compound, selected from the group consisting of the La(III) compounds.

16. The battery according to claim 1, wherein said enhancing material, is a cerium compound, selected from the group consisting of the Ce(III), or Ce(IV) compounds.

17. The battery according to claim 1, wherein said enhancing material, is a neodymium compound, selected from the group consisting of the Nd(III) compounds.

18. The battery according to claim 1, wherein said enhancing material, is a europium compound, selected from the group consisting of the Eu(II) or Eu(III) compounds.

* * * * *